United States Patent
Tsai et al.

(10) Patent No.: US 10,288,256 B2
(45) Date of Patent: May 14, 2019

(54) LIGHT GUIDE LENS, LIGHT EMITTING MODULE AND DISPLAY APPARATUS INCLUDING THE SAME

(71) Applicants: RADIANT OPTO-ELECTRONICS (SUZHOU) CO., LTD, Wujiang, Jiangsu Province (CN); RADIANT OPTO-ELECTRONICS CORPORATION, Kaohsiung (TW)

(72) Inventors: Shu-An Tsai, Kaohsiung (TW); Hui-Yu Huang, Kaohsiung (TW); I-Cheng Liu, Kaohsiung (TW)

(73) Assignees: RADIANT OPTO-ELECTRONICS (SUZHOU) CO., LTD., Suzhou (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 15/672,974

(22) Filed: Aug. 9, 2017

(65) Prior Publication Data

US 2017/0336051 A1  Nov. 23, 2017

Related U.S. Application Data

(63) Continuation-in-part of application No. PCT/CN2015/099435, filed on Dec. 29, 2015.

(30) Foreign Application Priority Data

Oct. 9, 2015  (CN) .......................... 2015 1 0649262

(51) Int. Cl.
*F21V 5/04* (2006.01)
*F21V 8/00* (2006.01)
(Continued)

(52) U.S. Cl.
CPC ................ *F21V 5/04* (2013.01); *G02B 6/003* (2013.01); *G02B 19/0014* (2013.01); *G02B 19/0061* (2013.01); *G02B 27/0955* (2013.01)

(58) Field of Classification Search
CPC . F21V 5/002–5/005; F21V 5/04; F21V 5/048; G02B 27/0955; G02F 2001/133607; G02F 2001/133603
See application file for complete search history.

(56) References Cited

U.S. PATENT DOCUMENTS 9,097,956 B2    8/2015  Wang He
2006/0238884 A1*  10/2006  Jang .......................... F21V 5/04
                                                     359/653

(Continued)

FOREIGN PATENT DOCUMENTS

CN  202927738 U  5/2013
CN  103883975 A  6/2014
(Continued)

OTHER PUBLICATIONS

Machine English translation of CN 204494304 U.*
(Continued)

*Primary Examiner* — Alexander K Garlen
(74) *Attorney, Agent, or Firm* — Schwegman Lundberg & Woessner, P.A.

(57) ABSTRACT

A light guide lens includes a main body. The main body includes a light exiting surface, a light incident surface opposite to the light exiting surface, and a plurality of microstructure members formed on the light incident surface and extending radially and being oriented to a microstructure center. A light emitting module and a display apparatus is also included.

11 Claims, 13 Drawing Sheets

(51) Int. Cl.
*G02B 19/00* (2006.01)
*G02B 27/09* (2006.01)

(56) References Cited

U.S. PATENT DOCUMENTS

| | | | | |
|---|---|---|---|---|
| 2013/0265777 | A1* | 10/2013 | Zollers | F21V 13/04 362/327 |
| 2014/0001507 | A1* | 1/2014 | Streppel | F21V 5/002 257/98 |
| 2014/0119027 | A1* | 5/2014 | Takatori | G02B 19/0014 362/297 |
| 2014/0168994 | A1* | 6/2014 | Wang He | F21V 5/04 362/311.02 |
| 2014/0301065 | A1* | 10/2014 | Jeong | F21V 13/12 362/97.1 |
| 2015/0117029 | A1* | 4/2015 | Dai | G02B 19/0014 362/311.06 |
| 2015/0260371 | A1* | 9/2015 | Takatori | G02F 1/133603 362/97.1 |

FOREIGN PATENT DOCUMENTS

| | | |
|---|---|---|
| CN | 104048262 A | 9/2014 |
| CN | 104296067 A | 1/2015 |
| CN | 204494304 U | 7/2015 |
| CN | 205245081 U | 5/2016 |
| TW | M492444 U | 12/2014 |
| TW | 201516534 A | 5/2015 |
| WO | WO 2013034522 A1 | 3/2013 |
| WO | WO 2015135697 U | 9/2015 |

OTHER PUBLICATIONS

A Search Report from corresponding TW Application No. 104134226 dated May 23, 2016; 2 pgs. with a translation.
A Search Report from corresponding TW Application No. 104134226 dated Jan. 16, 2017; 2 pgs. with a translation.
A Search Report from corresponding PCT Application No. PCT/CN2015/099435 dated Jun. 29, 2016; 14 pgs. with a translation.

* cited by examiner

LIGHT GUIDE LENS, LIGHT EMITTING MODULE AND DISPLAY APPARATUS INCLUDING THE SAME

CROSS-REFERENCE TO RELATED APPLICATION

This application is a bypass continuation-in-part application of International Application No. PCT/CN2015/099435 filed on Dec. 29, 2015, which claims priority of Chinese Patent Application No. 201510649262.5, filed on Oct. 9, 2015.

FIELD

The disclosure relates to a light guide lens, and more particularly to a light guide lens including a plurality of microstructure members, and a light emitting module and a display apparatus including the light guide lens.

BACKGROUND

Referring to FIG. 1A, a conventional light guide lens 1, which is used with a light emitting diode (LED) 10, includes a main body 11 having a light incident surface 12 that faces the LED 10 and that is concave away from the LED 10, and a cambered light exiting surface 13 that is opposite to the light incident surface 12. Light emitted from the LED 10 is first refracted at the light incident surface 12, and then refracted again at the cambered light exiting surface 13. Hence, alight emitting angle of the light emitting module is increased.

Since the light emitting module tends to be thinned for commercial demand, the conventional light guide lens 1 is desired to have a reduced thickness to shorten an optical path required for light mixing of a plurality of the light emitting modules. However, reduction in the thickness of the conventional light guide lens 1 will unavoidably harmful to breadth of the light emitting angle of the light emitting module. Hence, there is plenty of room for improvement in a light guide lens of a light emitting module for having a desired lens thickness without sacrificing the breadth of the light emitting angle of the light emitting module.

SUMMARY

Therefore, an object of the disclosure is to provide a light guide lens that can alleviate at least one of the drawbacks of the prior art.

According to one aspect of the disclosure, a light guide lens includes a main body. The main body includes a light exiting surface, a light incident surface opposite to the light exiting surface, and a plurality of microstructure members formed on the light incident surface and extending radially and being oriented to a microstructure center.

According to another aspect of the disclosure, a light emitting module includes the aforementioned light guide lens, and a light source.

The light source is disposed beneath the light guide lens to face the light incident surface of the light guide lens. Light emitted by the light source enters the light lens through the light incident surface and exits from the light guide lens through the light exiting surface.

According to yet another aspect of the disclosure, a display apparatus includes an optical sheet, a plurality of the abovementioned light emitting modules, and a display panel.

The optical sheet has a backside and alight emitting side that is opposite to the back side.

The light emitting modules face the backside of the optical sheet.

The display panel faces the light emitting side of the optical sheet.

Light emitted from the light sources enters the light guide lens through the light incident surfaces and exits from the light guide lenses through the light exiting surface and then passes through the optical sheet and the display panel, such that the light emitting modules serve as aback light source.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1A:
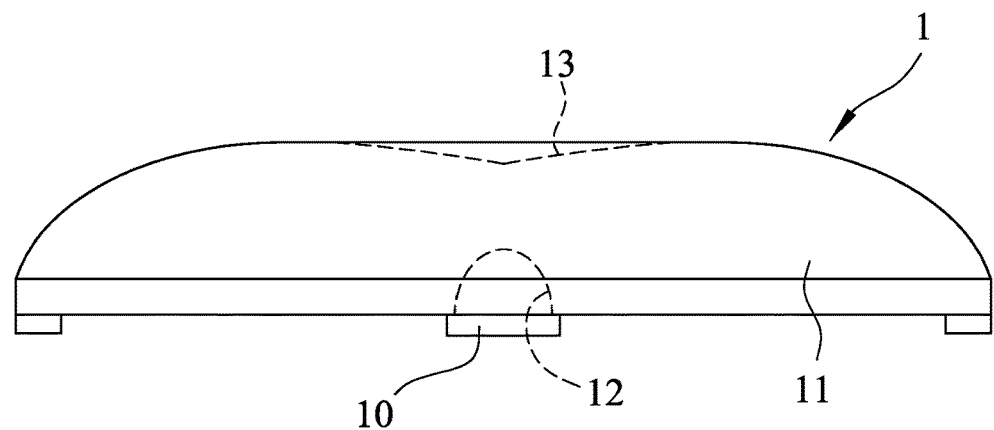
FIG. 1A is a schematic side view illustrating a conventional light guide lens.
Figure 1B:
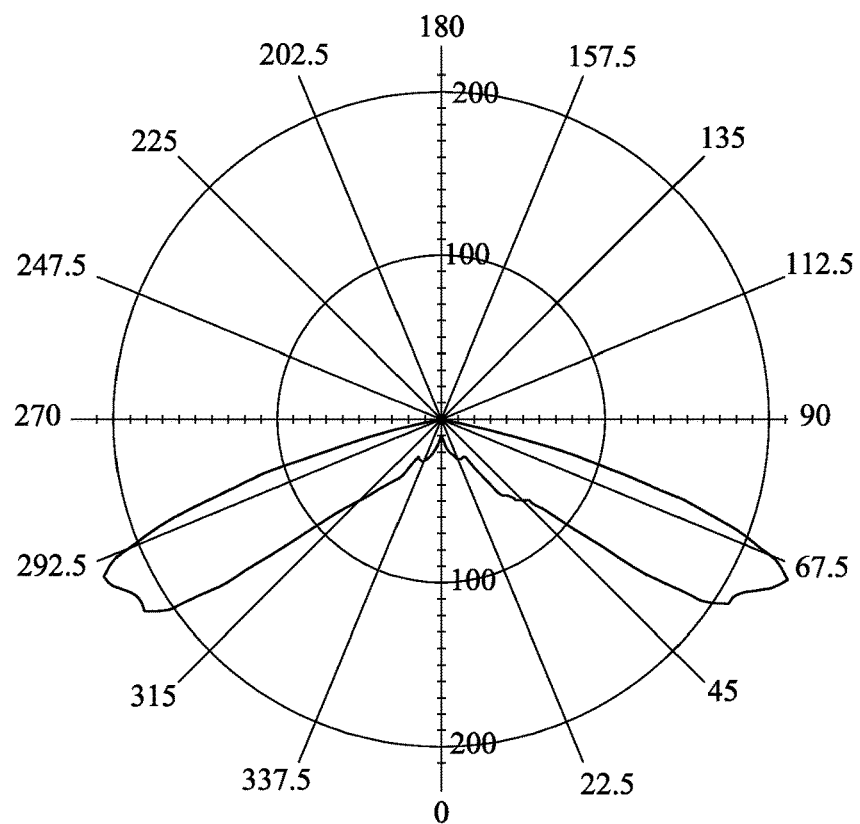
FIG. 1B is a radiation pattern illustrating a light field distribution of light emitted from the conventional light guide lens.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
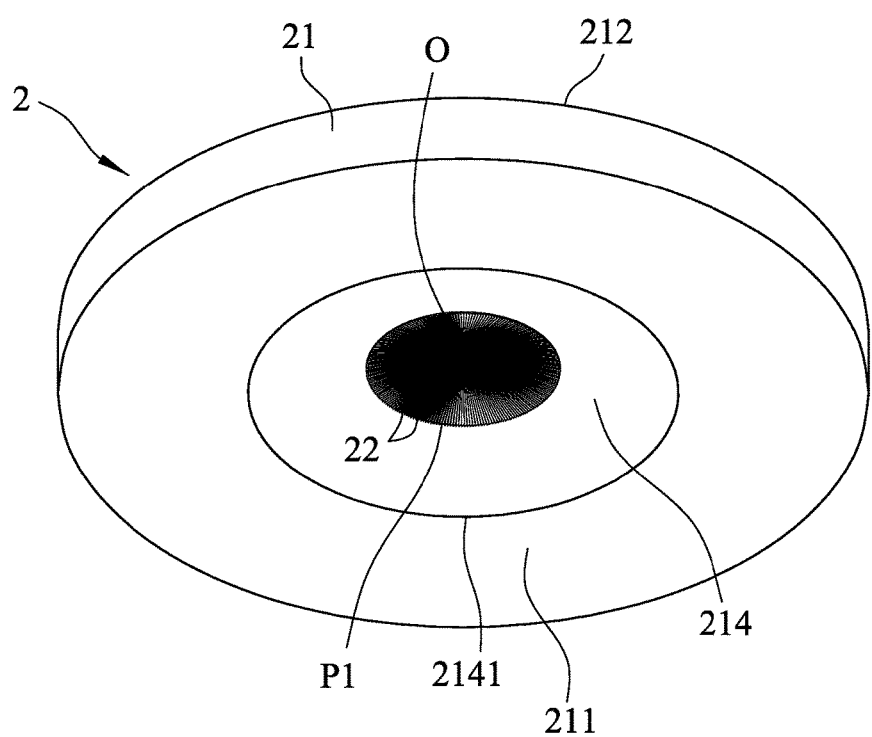
FIG. 2 is a schematic perspective view illustrating a first embodiment of the light guide lens according to the disclosure.
Figure 3:
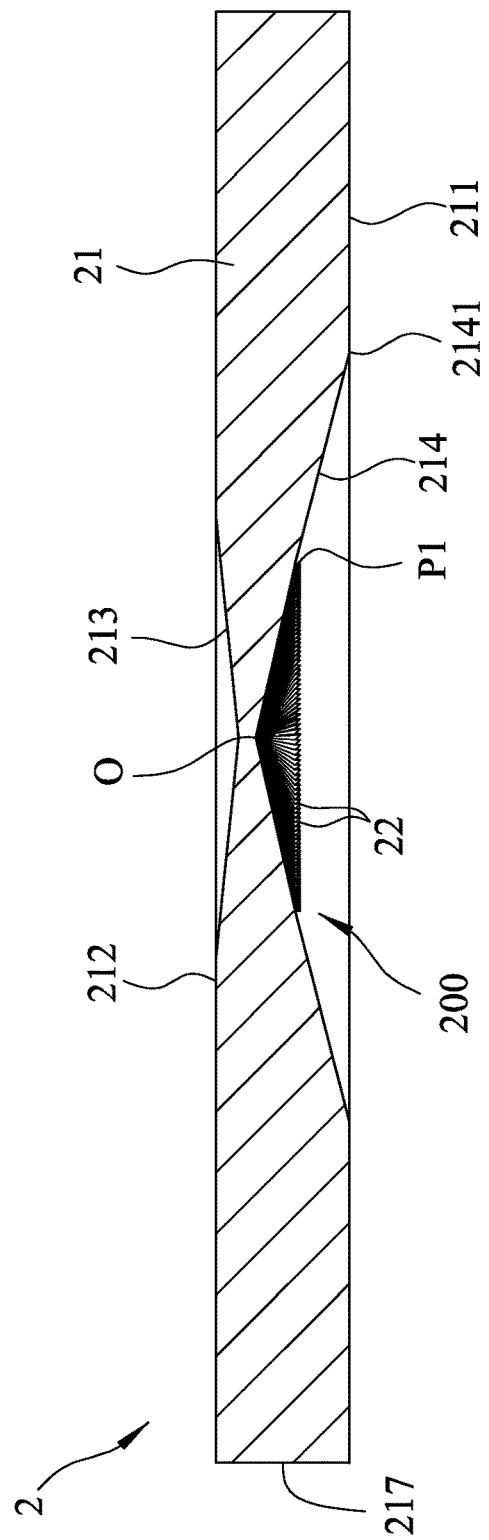
FIG. 3 is a cross-sectional schematic view illustrating the first embodiment of the light guide lens.

Referring to FIGS. 2 and 3, a first embodiment of the light guide lens 2 includes a main body 21. The main body 21 includes a light exiting surface 212, a light incident surface 211 that is opposite to the light exiting surface 212, and a plurality of microstructure members 22. The microstructure members 22 are formed on the light incident surface 211 and extend radially and are oriented to a microstructure center (O). On the other hand, the microstructure members 22 extend along a radial direction originating from the microstructure center (O). The light incident surface 211 has a conical surface region 214 defining a receiving space 200. The microstructure center (O) coincides with a center of the conical surface region 214. The microstructure members 22 are formed on at least a part of the conical surface region 214. More specifically, each of the microstructure members 22 has one end which meets the center of the conical surface region 214 and the other end which terminates at a position P1 spaced apart from an outer peripheral edge 2141 of the conical surface region 214. The light exiting surface 212 has a conical cavity 213 that corresponds in position to the conical surface region 214 of the light incident surface 211.

Figure 4:
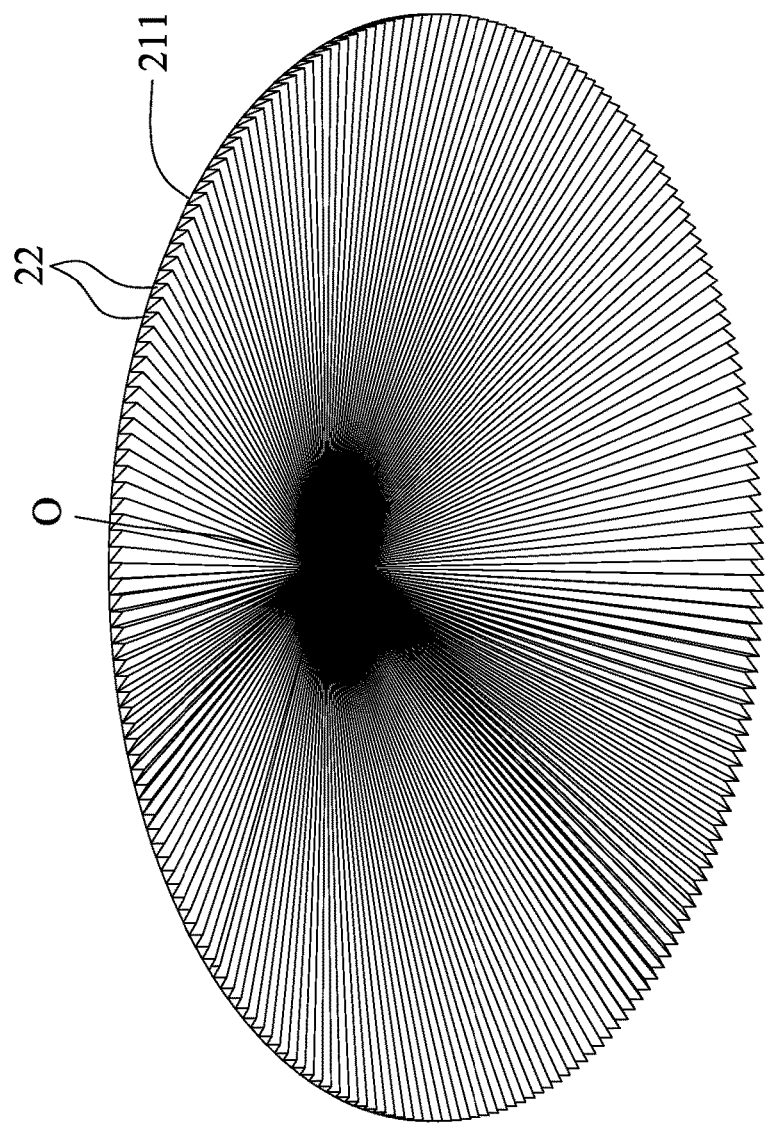
FIG. 4 is a partly enlarged perspective view of the first embodiment of the light guide lens, illustrating microstructure members formed thereon.

Referring to FIG. 4, each of the microstructure members protrudes from the light incident surface 211. The microstructure members 22 are disposed along a full circle around the microstructure center (O). Each of the microstructure members 22 is prism shaped so that a light incident angle at an interface between air and the light incident surface 211 is changed to guide a travel path of light entering the light guide lens 2.

Figure 5A:
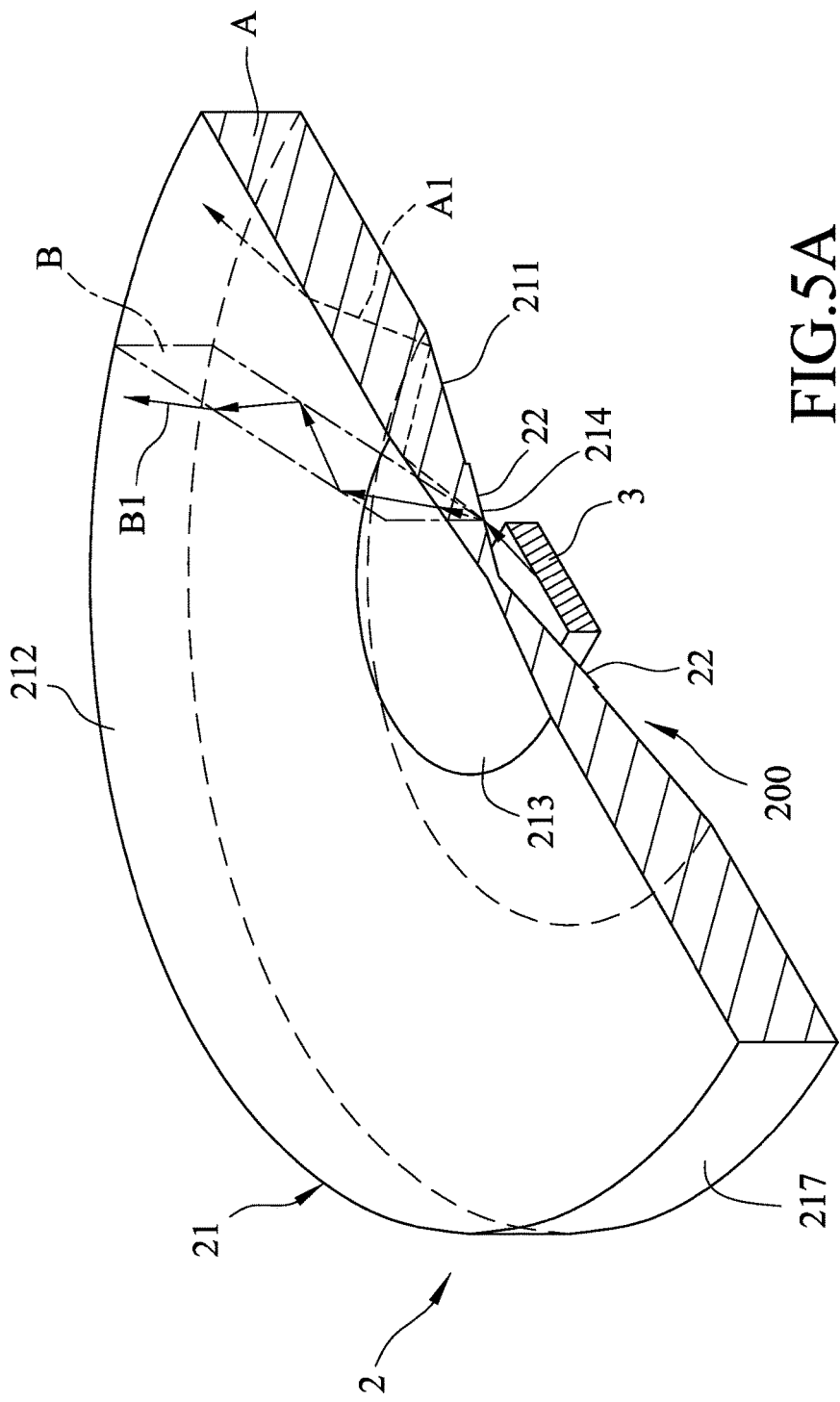
FIG. 5A is a schematic view illustrating a first embodiment of a light emitting module according to the disclosure with an indication of an optical path of light passing through microstructure members of a light guide lens microstructure members.
Figure 5B:
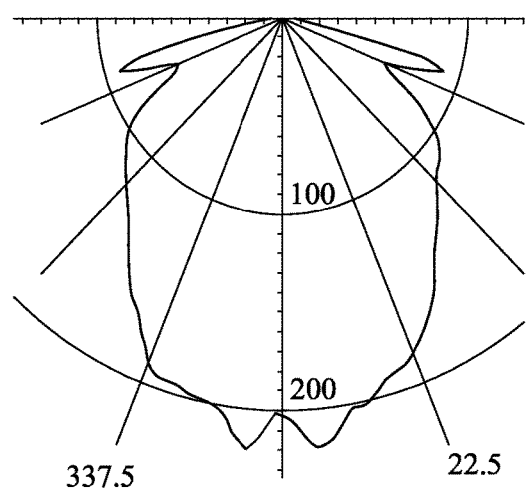
FIG. 5B is a radiation pattern illustrating light field distribution of light passing through an area of the light guide lens which is free of microstructure members.

Referring to FIG. 5A, a first embodiment of a light emitting module according to the disclosure includes the light guide lens 2 illustrated in FIGS. 2 to 4, and a light source 3. The light source 3 is disposed beneath the light guide lens 2 in the receiving space 200 to face the light incident surface 211 of the light guide lens 2. Light emitted by the light source 3 passes through the light guide lens 2 through entering the light incident surface 211 and then exiting from the light exiting surface 212. Referring to FIG. 5A in combination with FIG. 5B, a solid meander line B1 illustrates a light path of the light emitted from the light source 3 and entering the main body 21 through a portion of the conical surface region 214 that are formed with the microstructure members 22. A dashed meander line A1 illustrates a light path of the light emitted from the light source 3 and entering the main body 21 through the conical surface region 214 in the same position as that of the solid meander line B1 in case that the conical surface region 214 is free of the microstructure members 22. Specifically, the light, which enters the main body 21 through the conical surface region 214 free of the microstructure members 22, will have internal reflection along the dashed meander line A1 on a reference plane A, and be refracted to exit the light exiting surface 212 in position relatively close to the conical cavity 213 and distal from the conical surface region 214. The light following the light path of the dashed meander line A1 has a relatively narrow breadth of the light emitting angle as shown in the center-concentrated radiation pattern of the light field distribution of FIG. 5B. Contrastively, the light, which enters the main body 21 through the portion of the conical surface region 214 formed with the microstructure members 22, will be refracted to have total internal reflection along the solid meander line B1 on a reference plane B instead of the dashed meander line A1 on the reference plane A, and then be refracted to exit the light exiting surface 212. In other words, the light entering the conical surface region 214 formed with the microstructure members 22 will be refracted to exit the light exiting surface 212 in position relatively far away the conical cavity 213 through multiple times of the total internal reflection in a direction away from the center of the conical surface region 214. Thus, the light exiting the light exiting surface 212 will have a relative broad breadth of the light emitting angle and a relative broad radiation pattern of the light field distribution of FIG. 7.

Figure 6:
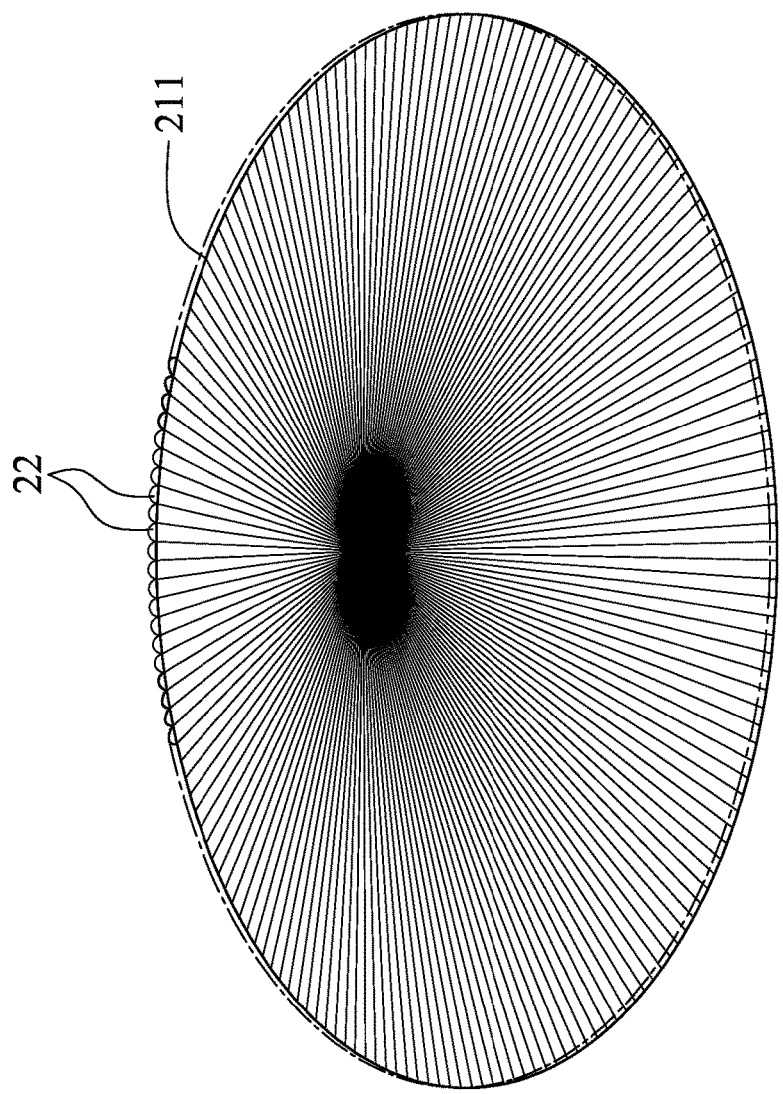
FIG. 6 is a partly enlarged perspective view illustrating another configuration of the embodiment of the light guide lens.

Referring to FIG. 6 in combination with FIG. 5A, another configuration of the microstructure members 22 of the light guide lens 2 is illustrated. Each of the microstructure members 22 is a groove that is formed in the light incident surface 211.

Figure 7:
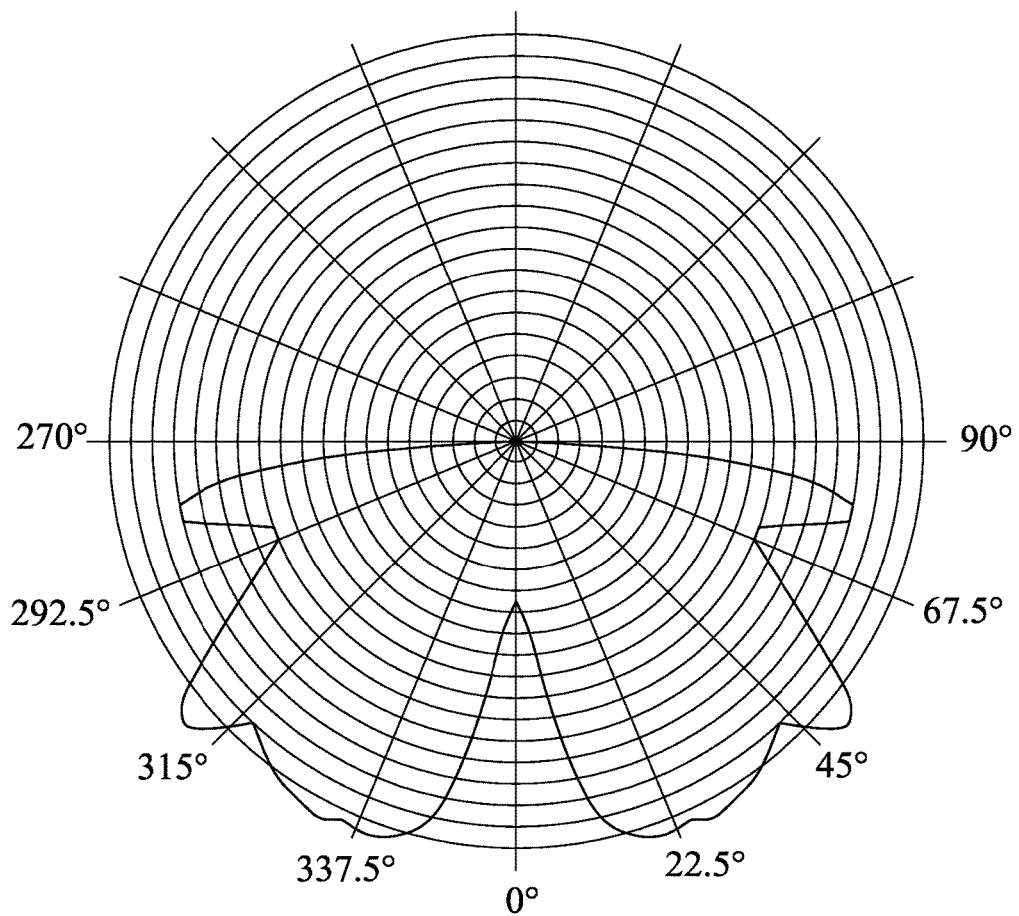
FIG. 7 is a radiation pattern illustrating light field distribution of light exiting from the light guide lens of FIG. 4.

It is noted that with the structural arrangement of the microstructure members 22 of FIG. 6, instead of an increase of the thickness of the main body 21, the light is refracted by the microstructure members 22 of the thinned light guide lens 2 and exits the light exiting surface 212 with a relatively broad breadth of the light emitting angle of the light guide lens 2 as shown in FIG. 7. When a plurality of the light emitting modules of the disclosure are intended to be used with a liquid crystal display (LCD) panel (not shown), compared with the conventional light emitting modules, since the light emitting modules of the disclosure have the relative broad breadth of the light emitting angle and the relative broad radiation pattern of the light field distribution, a light-mixing distance between the light emitting modules and the LCD panel, i.e., the optical path required for light mixing of the light emitting modules, can be reduced without changing the amount of the light emitting modules for deliberately reducing the distance among the light emitting modules. On the alternative way, a predetermined light-mixing distance can be maintained as in the conventional backlight module or even shorter by increasing the distance among the light emitting modules so that the light emitting modules in reduced amount.

Figure 8:
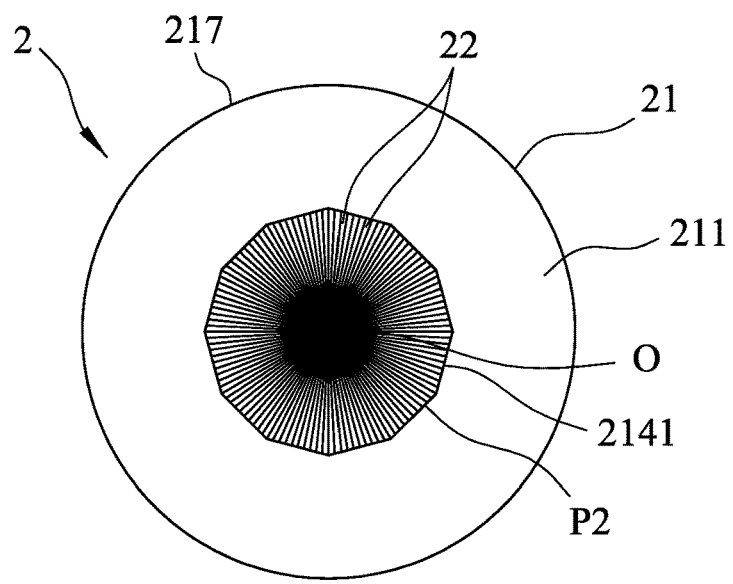
FIG. 8 is a bottom view illustrating a second embodiment of the light guide lens according to the disclosure.
Figure 14:
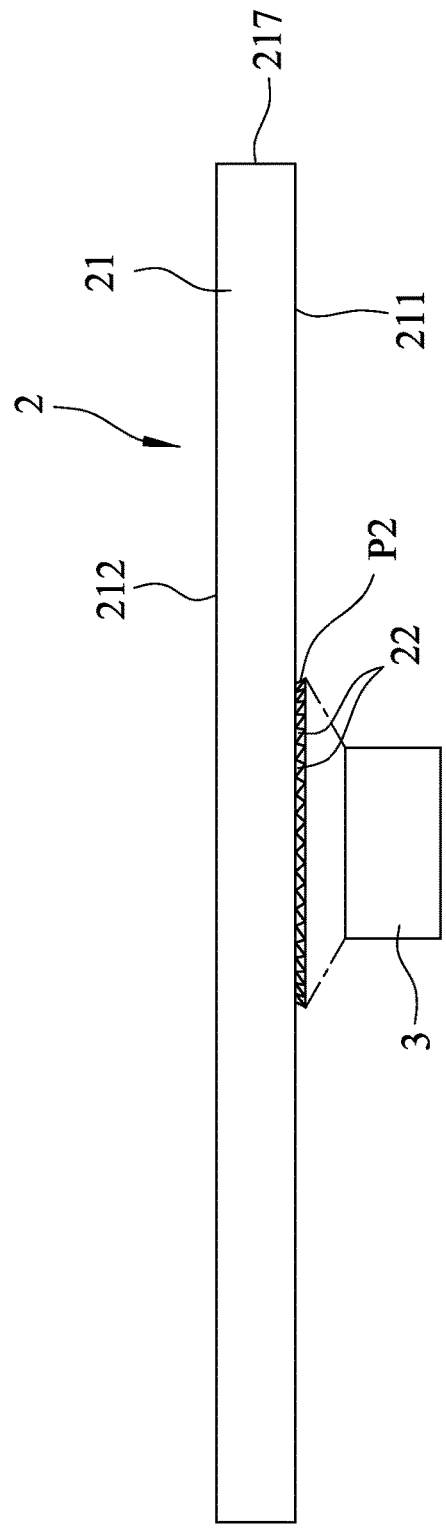
FIG. 14 is a schematic view illustrating a second embodiment of a light emitting module according to the disclosure.

Referring to FIGS. 8 and 14, a second embodiment of the light guide lens 2 is similar to the first embodiment except that the light incident surface 211 is entirely flat. The main body 21 further includes a peripheral edge portion 217 that interconnects the light incident surface 211 and the light exiting surface 212. Each of the microstructure members 22 has one end that meets the center of the light incident surface 211 and the other end that terminates at a position (P2) spaced apart from the peripheral edge portion 217 to coordinate with a light emitting angle of the light emitted from the light source 3 to the light guide lens 2 so that the light emitted from the light source 3 can be efficiently refracted by the microstructure members 22. Therefore, a part of the light generated near the center of the light source 3, entering the main body 21 through the microstructure members 22 formed near the center of the light incident surface 211, has a breadth of the light emitting angle broader than that of another part of the light generated away the center of the light source 3, entering the main body 21 through the flat light incident surface 211 that is not formed with the microstructure members 22. In other words, by way of designing the microstructure members 22 formed near the center of the light incident surface 211, the light emitting angle of the light at the center will be increased, thereby broadening the light field of the light guide lens 2 at the center.

Figure 9:
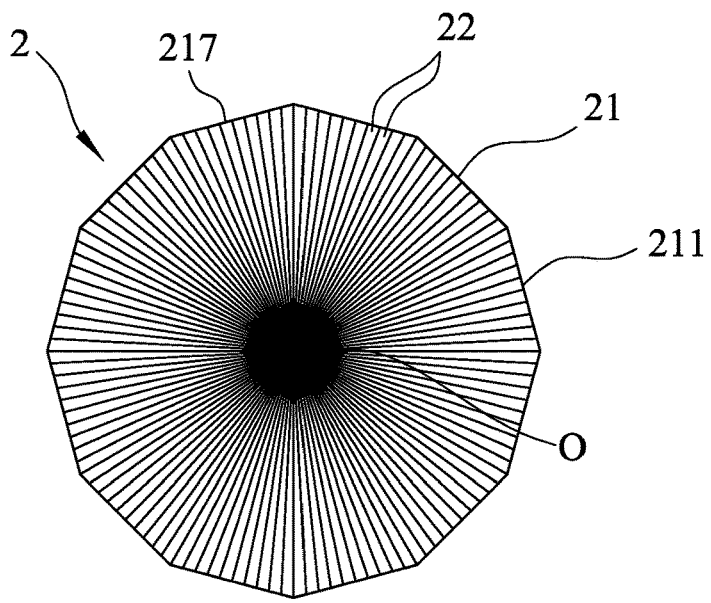
FIG. 9 is a bottom view illustrating a third embodiment of the light guide lens according to the disclosure.

Referring to FIG. 9, a third embodiment of the light guide lens 2 is similar to the second embodiment except that each of the microstructure members 22 has one end that meets the center of the light incident surface 211 and the other end that terminates at the peripheral edge portion 217. Therefore, most of the light exiting from the main body 21 through the microstructure members 22 has a relatively broad breadth of the light emitting angle. In comparison to the aforementioned second embodiment in FIG. 8, there will be more amount of light refracted at the microstructure members 22 in the third embodiment in FIG. 9, not only the light emitting angle of the light at the center will be increased, but the light emitting angle of the light away the center will also be increased, and the light field is accordingly broadened.

Figure 10:
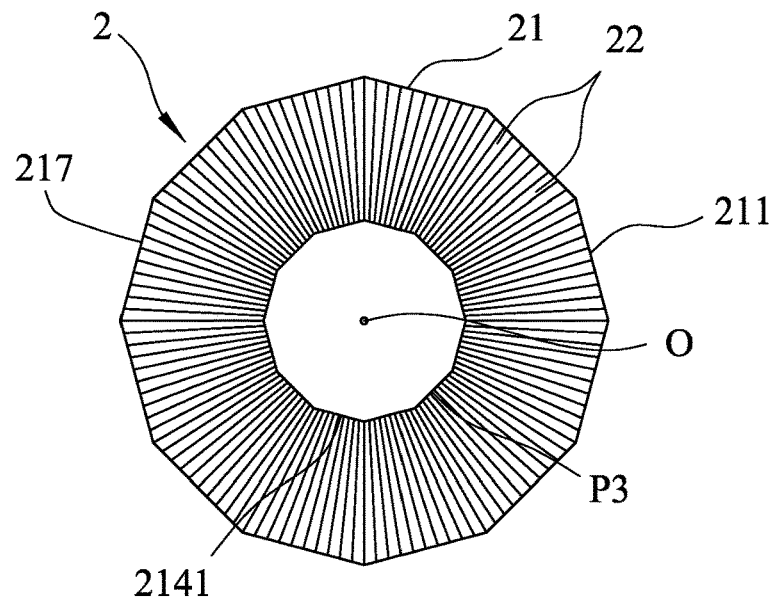
FIG. 10 is a bottom view illustrating a fourth embodiment of the light guide lens according to the disclosure.

Referring to FIG. 10, a fourth embodiment of the light guide lens 2 is similar to the third embodiment except that each of the microstructure members 22 has one end terminating at a position (P3) distant from the center of the light incident surface 211 and the other end terminating at the peripheral edge portion 217. When the breadth of the light emitting angle of the light source 3 is relatively broad and the light emitted from a central portion of the light source 3 does not have to be refracted, this embodiment may coordinate with the light source 3 of this kind by refracting the light emitted from a portion of the light source 3 that has a broader breadth of the light emitting angle and that is away from the central portion of the light source 3, so that the light can be appropriately guided to provide a relatively broader breadth of the light emitting angle while the light field of the light guide lens 2 at the center is not further broadened.

Figure 11:
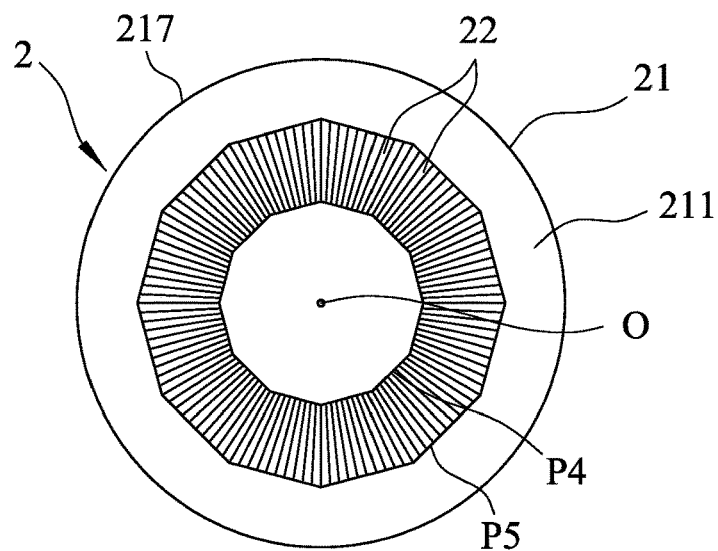
FIG. 11 is a bottom view illustrating a fifth embodiment of the light guide lens according to the disclosure.

Referring to FIG. 11, a fifth embodiment of the light guide lens 2 is similar to the fourth embodiment except that each of the microstructure members 22 has one end terminating at a first position (P4) distant from the center of the light incident surface 211 and the other end terminating at a second position (P5) between the first position (P4) and the peripheral edge portion 217. Since the light emitted from the light source may not reach the peripheral edge portion 217 of the main body 21, the configuration of the microstructure members 22 of this embodiment will reduce cost and operation of the microstructure-member production without sacrificing the breadth of the light emitting angle.

Figure 12:
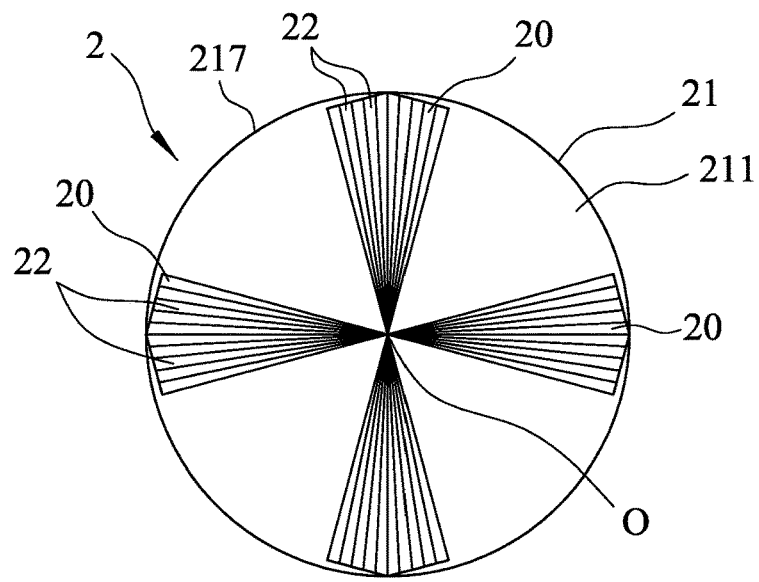
FIG. 12 is a bottom view illustrating a sixth embodiment of the light guide lens according to the disclosure.

Referring to FIG. 12, a sixth embodiment of the light guide lens 2 is similar to the third embodiment except that the microstructure members 22 are arranged in clusters 20 around the microstructure center (O). The clusters 20 are angularly spaced apart from each other relative to the microstructure center (O). Each of the clusters 20 is disposed in a sector of a circle around the microstructure center (O). When the light enters the main body 21 through the microstructure members 22, the light will be refracted and guided by the microstructure members 22 so as to have a relatively broad light emitting angle. When the light enters the main body 21 through a region of the light incident surface 211 free of the microstructure members 22, the light will be refracted by the flat region so as to have a relatively narrow light emitting angle. With the design of the clusters 20, the light exiting from the light exiting surface 13 can have a predetermined radiation pattern of light field distribution in compliance with the actual applications.

Figure 13:
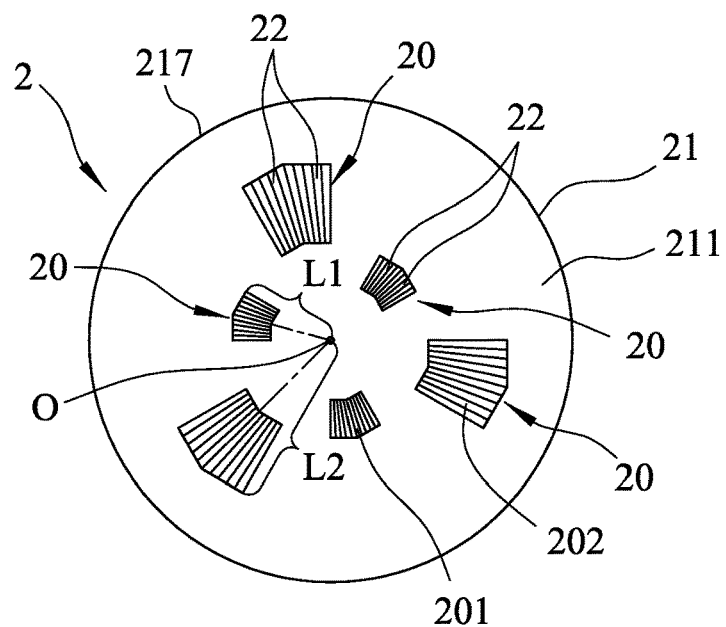
FIG. 13 is a bottom view illustrating a seventh embodiment of the light guide lens according to the disclosure.

Referring to FIG. 13, a seventh embodiment of the light guide lens is similar to the sixth embodiment except that the clusters 20 include first and second clusters 201, 202, which are alternate to each other and each of which is spaced apart from the microstructure center (O). The first clusters 201 are closer to the microstructure center (O) than the second clusters 202. Each of the first clusters 201 has an area less than that of each of the second clusters 202. Each of the first clusters 201 have a radial length (L1), which is defined by a distance from the center of the microstructure center (O) to the farmost point of the microstructure members 22 relative to the microstructure center (O), less than that (L2) of each of the second clusters 202. With the design of the first and second clusters 201, 202, the dimensions of the first and second clusters 201, 202 are designed depending upon the distribution of the light emitting angle of the light emitting from the light source 3 and the intended light filed distribution of the light exiting the light emitting lens 2. Therefore, the light will be guided in different proportions according to the dimensions of the first and second clusters 201, 202 where the light passes through so that the light exiting from the light exiting surface 13 can have a predetermined radiation pattern of the light field distribution in compliance with the actual applications.

Referring to FIG. 14, a second embodiment of the light emitting module is illustrated, wherein the light guide lens 2 is feasible to be selected from one of the second embodiment to the seventh embodiment based on the actual applications.

Figure 15:
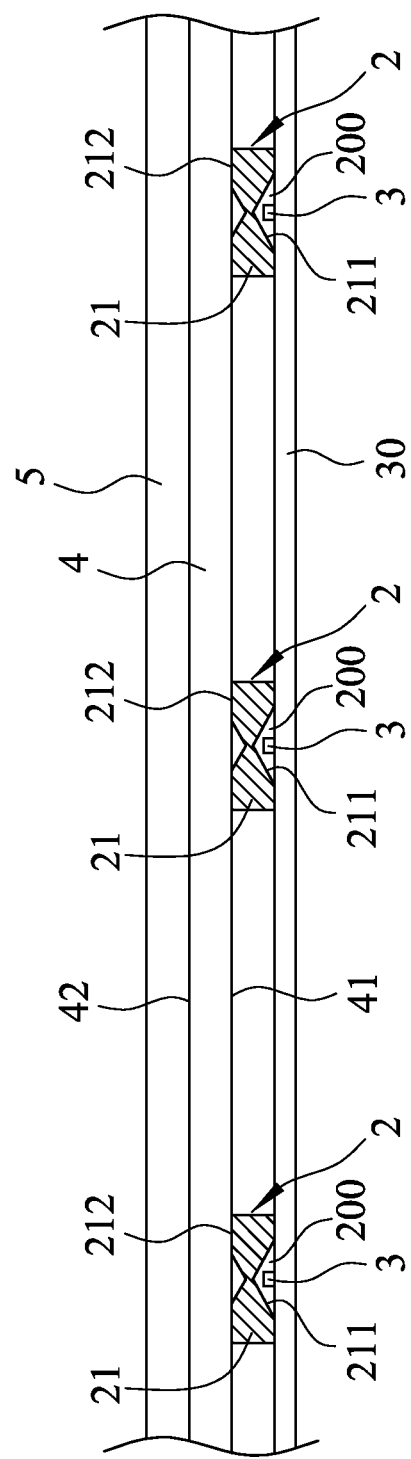
FIG. 15 is a schematic view illustrating an embodiment of a display apparatus according to the disclosure.

Referring to FIG. 15, an embodiment of a display apparatus includes an optical sheet 4, a plurality of the embodiment of the light emitting modules, and a display panel 5. The optical sheet 4 has a back side 41 and a light emitting side 42 that is opposite to the back side 41. The light emitting modules 2 face to the back side 41 of the optical sheet 4. The display panel 5 faces to the light emitting side 42 of the optical sheet 4. Light emitted from the light sources 3 enters the light incident surfaces 211 and exits from the light exiting surfaces 212 to pass through the light guide lenses 2, and then passes through the optical sheet 4 and the display panel 5, such that the light emitting modules serve as a back light source. More specifically, the optical sheet 4 is in contact with the light guide lenses 2 of the light emitting modules. Since the breadth of light emitting angle of the light emitting modules is relatively broad, the light-mixing distance required by the light emitting modules is relatively decreased. Furthermore, the light source 3 is disposed in the space 200 defined by the conical surface region 214 of the light incident surface 211, and thus the entire thickness of the display apparatus can be reduced.

By virtue of the microstructure members 22 of the light guide lens 2, the light emitting angle and the radiation pattern of the light field distribution of the light exiting surface 212 of the light guide lens 2 of the light emitting module can be improved so that the distance of light mixing and the thickness of the main body 21 of the light guide lens 2 can be reduced. Thus, the display apparatus including the light emitting module can be efficiently thinned for commercial demand.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A light guide lens, comprising
a main body including:
a light exiting surface;
a light incident surface opposite to said light exiting surface; and
a plurality of microstructure members formed on said light incident surface and extending radially and being oriented to a microstructure center, wherein said microstructure members are arranged in clusters around the microstructure center, said clusters of said microstructure members being angularly spaced apart from each other relative to the microstructure center, each of said clusters being disposed in a sector of a circle around said microstructure center.

2. The light guide lens of claim 1, wherein said light incident surface has a conical surface region, said microstructure center coinciding with a center of said conical surface region, said microstructure members being formed on at least a part of said conical surface region.

3. The light guide lens of claim 2, wherein said microstructure members meet the center of said conical surface region.

4. The light guide lens of claim 2, wherein said light exiting surface has a conical cavity corresponding in position to said conical surface region of said light incident surface.

5. The light guide lens of claim 2, wherein each of the microstructure members has one end which meets the center of the conical surface region and the other end which terminates at a position spaced apart from an outer peripheral edge of the conical surface region.

6. The light guide lens of claim 1, wherein a portion of said light incident surface other than said microstructure members is flat.

7. The light guide lens of claim 1, wherein said clusters include first and second clusters, which are alternate to each other and each of which is spaced apart from the microstructure center, said first clusters being closer to said microstructure center than said second clusters, said first clusters having a radial length less than that of said second clusters.

8. The light guide lens of claim 1, wherein said clusters including first and second clusters each of which is spaced apart from the microstructure center, said first clusters being closer to the microstructure center than said second clusters, said first clusters having an area less than that of said second clusters.

9. A light emitting module, comprising:
a light guide lens as claimed in claim 1; and
a light source disposed beneath said light guide lens to face said light incident surface of said light guide lens, wherein light emitted by said light source enters said light lens through said light incident surface and exits from said light guide lens through said light exiting surface.

10. A display apparatus, comprising:
an optical sheet having a back side and an light emitting side that is opposite to said back side;
a plurality of light emitting modules as claimed in claim 9, which face to said back side of said optical sheet; and
a display panel facing to said light emitting side of said optical sheet;
wherein light emitted by said light sources enters said light guide lenses through said light incident surfaces and exits from said light guide lenses through said light exiting surfaces and then passes through said optical sheet and said display panel, such that said light emitting modules serve as a back light source.

11. The display apparatus of claim 10, wherein said optical sheet is in contact with said light guide lenses of said light emitting modules.

* * * * *